Dec. 23, 1952 A. G. MERKLE 2,622,954
COUNTER FOR THE COOLING, STORAGE, DISPLAY, AND
DISPENSING OF MEAT AND OTHER FOODSTUFFS
Filed May 5, 1949 2 SHEETS—SHEET 1
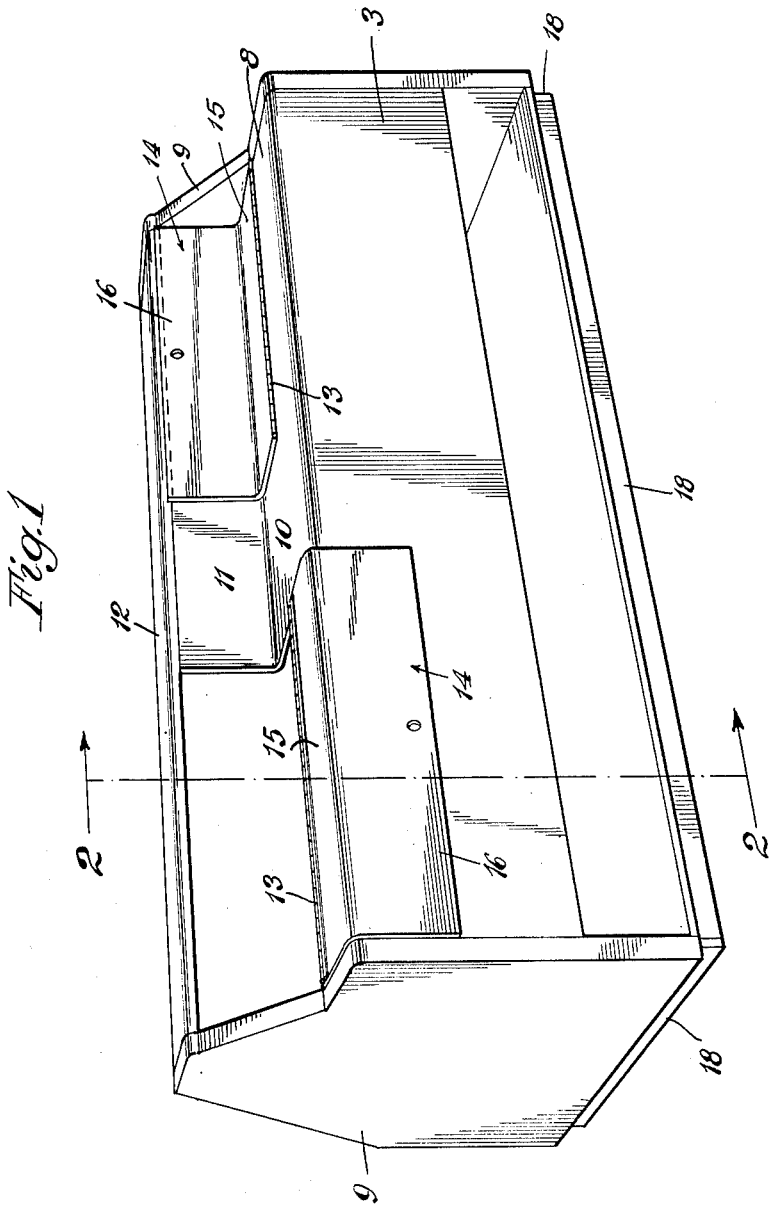
Inventor
Arthur G. Merkle
by Parker & Carter
Attorneys.

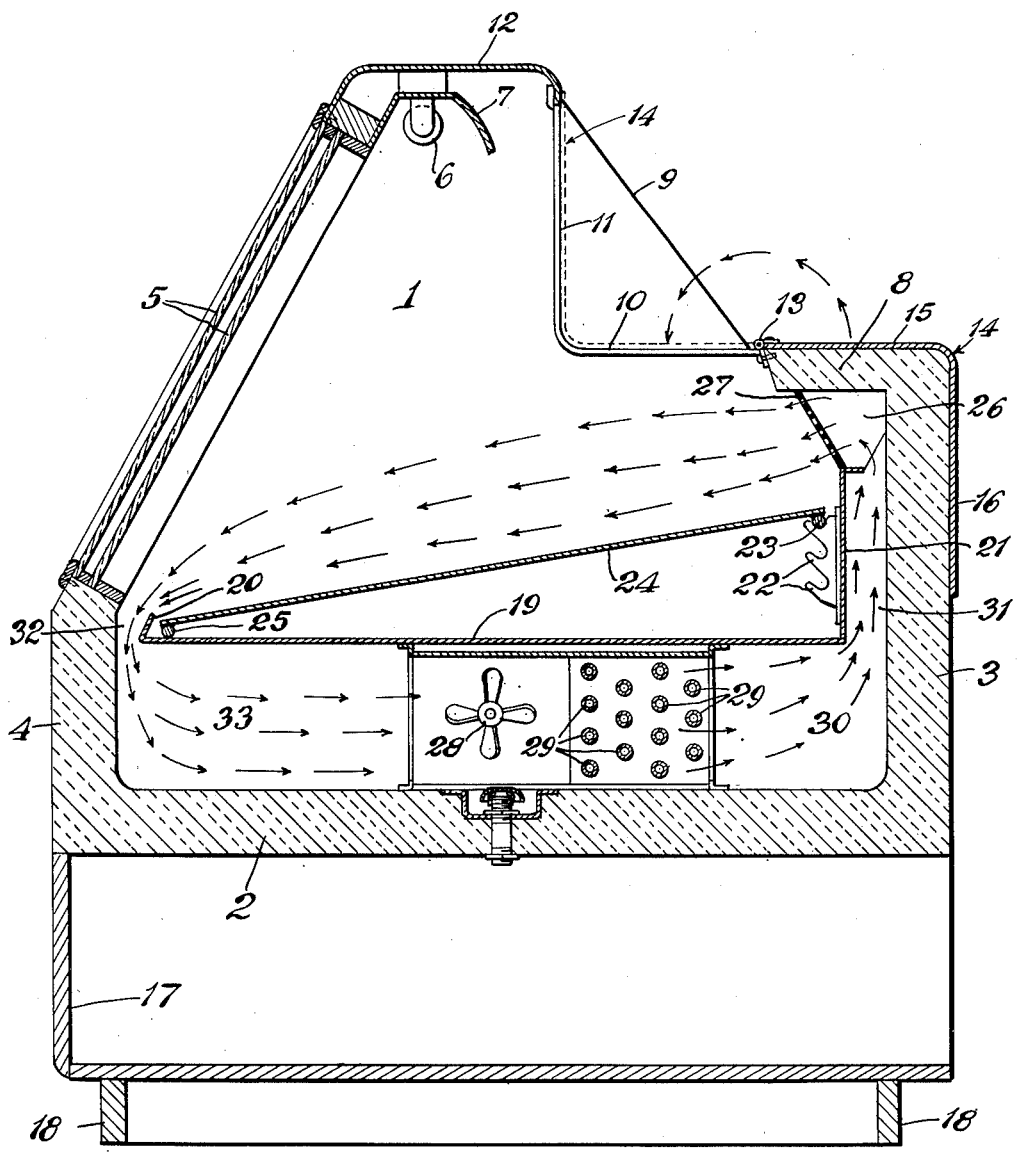

Patented Dec. 23, 1952

2,622,954

UNITED STATES PATENT OFFICE 2,622,954

COUNTER FOR THE COOLING, STORAGE, DISPLAY, AND DISPENSING OF MEAT AND OTHER FOODSTUFFS

Arthur G. Merkle, Marshall, Mich., assignor to Sherer-Gillett Company, Marshall, Mich., a corporation of Illinois Application May 5, 1949, Serial No. 91,553

15 Claims. (Cl. 312—140.1)

My invention relates to improvements in refrigerating meat display cases and has for one object to provide a new and improved form of meat display case which will have ample working space and wherein easy access to the contents of the display case may be had by the user while permitting adequate cooling of meat and the like contained therein.

Other objects will appear from time to time throughout the specification and claims.

My invention is illustrated more or less diagrammatically in the accompanying drawings, wherein—

Figure 1 is a perspective view of the back of the case with one of the working doors open, the other closed;

Figure 2 is a section along the line 2—2 of Figure 1.

Like parts are indicated by like characters throughout the specification and drawings.

1 is a meat storage and display chamber. It is contained within an insulating housing having a bottom wall 2, a back wall 3, a front wall 4 and an inclined double panel insulated glass wall 5. 6 is a light, 7 a light shield so that the light is reflected downwardly onto the meat or other material on the counter. The back wall 3 has a horizontal extension 8 extending throughout the length of the counter and the counter has end walls 9. Extending inwardly and then upwardly from the insulating horizontal wall portion 8 is a metallic working platform 10 having an upward extension 11 joining the cover 12, furnishing a place for working, scale or the like. On each side of the counter between the end walls 9 and the members 11, 12, the insulating horizontal member 8 carries hinges 13 located along the inner edge or boundary of the horizontal extension 8 on which are hinged doors 14, the doors each of them having a horizontal portion 15 and a vertical portion 16 so that when rotated back as shown in section in Figure 2 and at the left hand side of Figure 1, the door fits snugly on the wall portions 3 and 8 but when rotated into the position shown in the right hand side, the door engages the member 12 to close the counter.

The counter is supported on a box frame 17 and legs 18 from the floor in the usual manner. Inside the storage chamber is a horizontal floor 19 raised above the bottom wall 2. This floor has an upwardly and inwardly extending flange 20 at the front edge adjacent the window 5. It has a vertical flange 21 extending up toward the underside of the wall portion 8. On this flange 21 are hook brackets 22 adapted to receive a rod 23 on which may rest a display platform 24 which is supported on the other edge by a rod 25 adjacent the flange 20 so that the angle of the platform 24 may be adjusted as desired by the user. Above the flange 21, between it and the underside of the wall member 8 is defined an air passage 26 bounded on one side by the foraminous partition 27. Beneath the plate 19 is a fan 28 which may be operated by a motor not here shown to circulate air through the cooling pipes 29. The means for cooling those pipes forms no part of the present invention. Some of the air which is circulated through the pipes is permitted to pass out through the area 30, passage 26, the foraminous screen 27 downwardly across the surface of the material exposed on the sheet 24 down through the gap 32, thence into the chamber 33 back to the fan. Only a portion of the air circulated by the fan is circulated in this manner. Most of the air is circulated through the chamber between the top of the wall 2 and the bottom of the pan 19 to cool the underside of the display counter and to provide a mass of cold air in which meat or other materials are held. Only a little of the air actually circulates over the upper surface, enough however, to insure adequate cooling of the meat.

The arrangement of the floor 2, the vertically extending walls 3 and 4, and the upwardly inwardly inclined walls 5, defines a trough in which the cold air is entrapped. The cold air is always colder than the ambient air so the housing including the closed bottom and upwardly extending walls defines a trough from which the cold air does not escape unless it is warmed to a point where it rises above the walls of the trough.

The use and operation of my invention are as follows:

The problem of displaying meat and the like and selling or dispensing it from a display counter is a rather complicated one. The meat must be kept cold to avoid spoilage but it must not be desiccated and everything that can be done must be done to prevent the desiccation or drying of the exposed unwrapped meat cuts. If they are wrapped as they are in the home freezer for instance, they cannot be displayed, only the package is seen. If they are exposed for visual inspection then great care must be taken to minimize desiccation. They must be protected from the touch of the casual visitor and so should be handled only by the butcher who is dispensing or selling the product.

The butcher needs space at the back of the counter on which to work. It is of the utmost importance that as soon as the meat is taken out of the cold display counter, it be handled, weighed and packed with a maximum dispatch, just as near the meat as possible is desirable and that working surface should be high enough so that the customer does not get the impression that the butcher is doing something illegitimate with the meat behind the counter and masked from view. At the same time the counter must be high enough so that the customer can see into it easily.

My counter furnishes all these desiderata. The cooling coils in the bottom of the counter with the circulating fan for circulating air through those coils is located in a cold air chamber below any opening in the counter. The meat is displayed in this cold air chamber. The inclined platform must be adjusted to give the desired degree of inclination for visible inspection. Usually convection and air circulation will take care of the air temperature sufficiently so that the air above the meat will be sufficiently cooled for satisfactory display storage. Only a small part of the circulating air passes over the upper layer of the meat as is shown in Figure 2. Most of the air circulated through the pipes is being circulated for the purpose of maintaining a mass of cold air in the bottom of the refrigerator from which some cold air is withdrawn for flow over the meat. If all the air flowed over the meat, desiccation would be too rapid. The reduced flow is sufficient to maintain satisfactory temperatures in the storage area and above it while at the same time minimizing desiccation.

The opening through which access is had to the counter is above the cold air mass. The central portion of the counter is permanently closed as indicated at 10. This provides a place on which a scale may be mounted so that the meat may be weighed, the visual part of the scale, the dial or beam as the case may be, extending above the counter so as to be easily visible to the customer. The door at each end opens above a horizontal and a vertical wall so as to provide a wide access space, making it easy for the butcher to reach in and pick out meat from any part of the counter. When he does so, the door folded down over the wall as indicated in Figure 2, furnishes entirely adequate working space on which he may handle the meat. When the door is closed, any blood or juice which lies on the surface 15 are enclosed within the cold chamber and so the danger of juice, scraps, etc. falling on the floor and becoming unsanitary is minimized.

The two doors give ample access to the entire length of the counter. The closed portion on which the scale may be mounted is narrow enough so that the butcher can reach under it on either side for easy and free access to the meat. The fact that the door fits snugly in its closed position to close the counter and in its open position to adhere closely to the back wall of the counter and to the overhang, makes a compact arrangement which the butcher can easily use. Of course, under these circumstances meat is never placed on any exposed surface in the counter but is always placed and used and worked and packed on a surface which is normally within the cold closed counter, away and only exposed the short time that working is taking place. As a result the meat is kept, displayed and served in an exceedingly sanitary and effective manner.

By the arrangement proposed, it becomes possible to provide a meat display counter wherein properly refrigerated unwrapped meat may be stored and displayed for sale while normally open to and of easy access by the butcher, whereas in the conventional counter the case is normally closed and only open when the butcher has occasion to reach in for a particular piece of meat. By this arrangement, the case may be normally open at all times at the back and only closed after store hours, the time saving and labor saving of such an arrangement being obvious.

I claim:

1. In combination a display and storage counter for meat and the like, having a vertically disposed back wall terminating below the top of the counter, the wall having an inwardly extending horizontal extension below the top of the counter, a door along the inner boundary of the horizontal extension, adapted to engage the top of the counter to close it the door when in the closed position having a horizontal portion generally parallel with and in alignment with the top of the horizontal wall extension and an upward portion perpendicular thereto extending from the inner boundary of the horizontal portion to engage the top.

2. In combination a display and storage counter for meat and the like, having a vertically disposed back wall terminating below the top of the counter, the wall having an inwardly extending horizontal extension below the top of the counter, a door along the inner boundary of the horizontal extension, adapted to engage the top of the counter to close it, the door being adapted to lie upon the upper surface of the horizontal extension when in the open position, that part of the door surface which is exposed in the open position being adapted to serve as a working surface and being enclosed within the counter when the door is closed.

3. In combination a display and storage counter, having a vertically extending back wall, an inwardly extending horizontal extension carried by the wall, a door on the inner edge of said extension and having a horizontal portion in continuation of the horizontal wall extension, and a vertical portion extending upwardly from the inner edge of the door to close the counter.

4. In combination a display and storage counter, having a vertically extending back wall, an inwardly extending horizontal extension carried by the wall, a door pivoted along the inner edge of said extension and having a horizontal portion in continuation of the horizontal wall extension, and a vertical extension extending from the outer edge of the door upwardly to close the counter, the horizontal and vertical door portions being adapted when in the open position to engage respectively the upper surface of the horizontal wall extension and the outer surface of the vertical wall portion.

5. A storage and display counter having a vertically extending back wall and a horizontally and inwardly extending portion at right angles thereto, the counter having a fixed top above, and spaced inwardly from the inner boundary of the horizontal extension, a fixed closure member extending inwardly from the wall extension to a point immediately below the top and then extending upwardly to join the top, there being door apertures on either side thereof.

6. A storage and display counter having a vertically extending back wall and a horizontally and inwardly extending portion at right angles thereto, the counter having a fixed top above, and spaced inwardly from the inner boundary of the horizontal extension, a fixed closure member extending inwardly from the wall extension to a point immediately below the top and then extending upwardly to join the top, there being door apertures on either side thereof, a door pivoted on the wall extension having horizontal and vertical portions to conform when in the closed position, with the fixed vertical and horizontal closure members.

7. A storage and display counter having a vertically extending back wall and a horizontally and inwardly extending portion at right angles thereto, the counter having a fixed top above, and spaced inwardly from the inner boundary of the horizontal extension, a fixed closure member extending inwardly from the wall extension to a point immediately below the top and then extending upwardly to join the top, there being door apertures on either side thereof, a door pivoted on the wall extension having horizontal and vertical portions to conform when in the closed position, with the fixed vertical and horizontal closure members, the door being adapted when in the open position to closely engage simultaneously both the vertical and the horizontal wall surfaces.

8. In a display counter a vertical back wall having an inwardly extending horizontal extension, a horizontal door element pivoted on the extension along a horizontal axis, means for holding the door element in horizontal position, the door element being adapted when in the open position to lie on and fit the upper surface of the horizontal extension and the outer surface of the back wall.

9. A storage and display counter having a vertically extending back wall and a horizontally and inwardly extending portion at right angles thereto, the counter having a fixed top above, and spaced inwardly from the inner boundary of the horizontal extension, a fixed closure member extending inwardly from the wall extension to a point immediately below the top and then extending upwardly to join the top, there being door apertures on either side thereof, a door pivoted on the wall extension having horizontal and vertical portions to conform when in the closed position, with the fixed vertical and horizontal closure members, means for supporting the door in closed position, including an upwardly extending door element at right angles to the horizontal door portion and a counter top adapted to be engaged thereby.

10. A storage and display counter having a vertically extending back wall and a horizontally and inwardly extending portion at right angles thereto, the counter having a fixed top above, and spaced inwardly from the inner boundary of the horizontal extension, a fixed closure member extending inwardly from the wall extension to a point immediately below the top and then extending upwardly to join the top, there being door apertures on either side thereof, a door pivoted on the wall extension having horizontal and vertical portions to conform when in the closed position, with the fixed vertical and horizontal closure members, the door being adapted when in the open position to closely engage simultaneously both the vertical and the horizontal wall surfaces, means for supporting the door in closed position, including an upwardly extending door element at right angles to the horizontal door portion adapted to engage and rest upon the fixed counter top.

11. A storage and display counter having a vertically extending back wall and a horizontally and inwardly extending portion at right angles thereto, the counter having a fixed top above, and spaced inwardly from the inner boundary of the horizontal extension, a fixed closure member extending inwardly from the wall extension to a point immediately below the top and then extending upwardly to join the top, there being door apertures on either side thereof, a door pivoted on the wall extension having horizontal and vertical portions to conform when in the closed position, with the fixed vertical and horizontal closure members, the vertical door extension being adapted when the door is in the open position to snugly engage a vertical outside surface of the vertical wall portion.

12. A storage and display counter having a vertically extending back wall and a horizontally and inwardly extending portion at right angles thereto, the counter having a fixed top above, and spaced inwardly from the inner boundary of the horizontal extension, a fixed closure member extending inwardly from the wall extension to a point immediately below the top and then extending upwardly to join the top, there being door apertures on either side thereof, a door pivoted on the wall extension having horizontal and vertical portions to conform when in the closed position, with the fixed vertical and horizontal closure members, the door being adapted when in the open position to closely engage simultaneously both the vertical and the horizontal wall surfaces, the vertical door extension being adapted when the door is in the open position to snugly engage a vertical outside surface of the vertical wall portion.

13. In a display counter a vertical back wall having an inwardly extending horizontal extension, a horizontal door element pivoted on the extension along a horizontal axis, means for holding the door element in horizontal position, the door element being adapted when in the open position to lie on and fit the upper surface of the horizontal extension, the vertical door extension being adapted when the door is in the open position to snugly engage a vertical outside surface of the vertical wall portion.

14. A counter having a lower back wall with an inwardly extending horizontal element, a cover located above such extension, a door pivoted to the inner edge of the extension having a horizontal portion adapted to lie when in the closed position in continuation of the top of the wall extension and a vertical portion adapted to engage the cover, the size and shape of the door being such that when in the open position it lies on and snugly engages the top of the horizontal wall extension and the outer surface of the wall and provides access to the interior of the counter.

15. A counter having a lower back wall with an inwardly extending horizontal element, a cover located above such extension, a door pivoted to the inner edge of the extension having a horizontal portion adapted to lie when in the closed position in continuation of the top of the wall extension and a vertical portion adapted to engage the cover, the size and shape of the door being such that when in the open position it lies on and snugly engages the top of the horizontal wall extension and the outer surface of the wall and provides access to the interior of the counter, a fixed element in continuation of the vertical wall extension terminating immediately above the rear edge of the cover and having an upward extension anchored to the rear edge of the cover in general continuation of the door when the door is in the closed position.

ARTHUR G. MERKLE.

REFERENCES CITED

The following references are of record in the file of this patent:

UNITED STATES PATENTS

| Number | Name | Date |
|---|---|---|
| 1,800,863 | Johnson | Apr. 14, 1931 |
| 1,979,625 | Knapp | Nov. 6, 1934 |
| 2,066,312 | Bales | Jan. 5, 1937 |
| 2,171,878 | Krichton | Sept. 5, 1939 |
| 2,332,174 | Shreve | Oct. 19, 1943 |
| 2,421,314 | Brinkoeter | May 27, 1947 |
| 2,463,658 | Thrasher | Mar. 8, 1949 |
| 2,474,452 | Amyot | June 28, 1949 |
| 2,492,695 | Henderson | Dec. 27, 1949 |